United States Patent [19]
Kobayashi et al.

[11] Patent Number: 5,017,223
[45] Date of Patent: May 21, 1991

[54] RECORDING MATERIAL

[75] Inventors: Motokazu Kobayashi, Yokohama; Kohzoh Arahara; Toshiya Yuasa, both of Kawasaki; Takashi Kai, Hadano; Hiroshi Fukumoto, Kawasaki, all of Japan

[73] Assignee: Canon Kabushiki Kaisha, Tokyo, Japan

[21] Appl. No.: 385,365

[22] Filed: Jul. 27, 1989

[30] Foreign Application Priority Data

Jul. 29, 1988 [JP] Japan ................... 63-187982
May 19, 1989 [JP] Japan ................... 1-124250

[51] Int. Cl.⁵ .................................. C09D 11/02
[52] U.S. Cl. ........................... 106/20; 106/22; 106/23
[58] Field of Search ................. 106/20, 22, 23

[56] References Cited

U.S. PATENT DOCUMENTS

| | | | |
|---|---|---|---|
| 4,168,662 | 9/1979 | Fell | 106/22 |
| 4,352,901 | 10/1982 | Maxwell et al. | 106/20 |
| 4,389,503 | 6/1983 | Maxwell et al. | 106/22 |
| 4,838,940 | 6/1989 | Kan et al. | 106/22 |
| 4,880,465 | 11/1989 | Loria et al. | 106/20 |
| 4,881,084 | 11/1989 | Kan et al. | 106/25 |

Primary Examiner—William R. Dixon, Jr.
Assistant Examiner—Helene Klemanski
Attorney, Agent, or Firm—Fitzpatrick, Cella, Harper & Scinto

[57] ABSTRACT

A recording material including at least a liquid dispersion medium and an electrolyte contained therein; the electrolyte providing substantially no halogen ion in the liquid dispersion medium under electrolytic dissociation; the recording material being capable of changing its adhesiveness when imparted with a voltage by means of a pair of electrodes, thereby to selectively adhere to either one of the pair of electrodes.

11 Claims, 4 Drawing Sheets

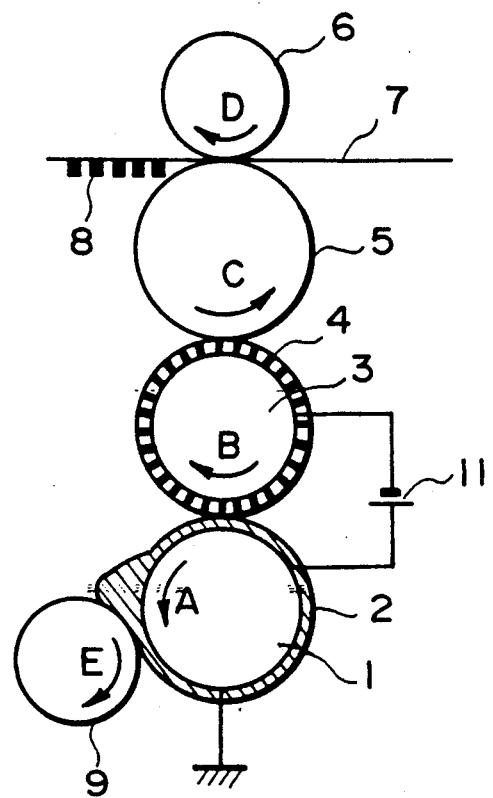
F I G. 1
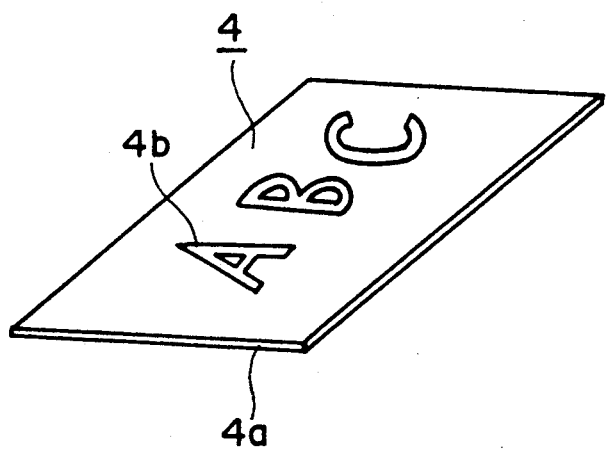
F I G. 2

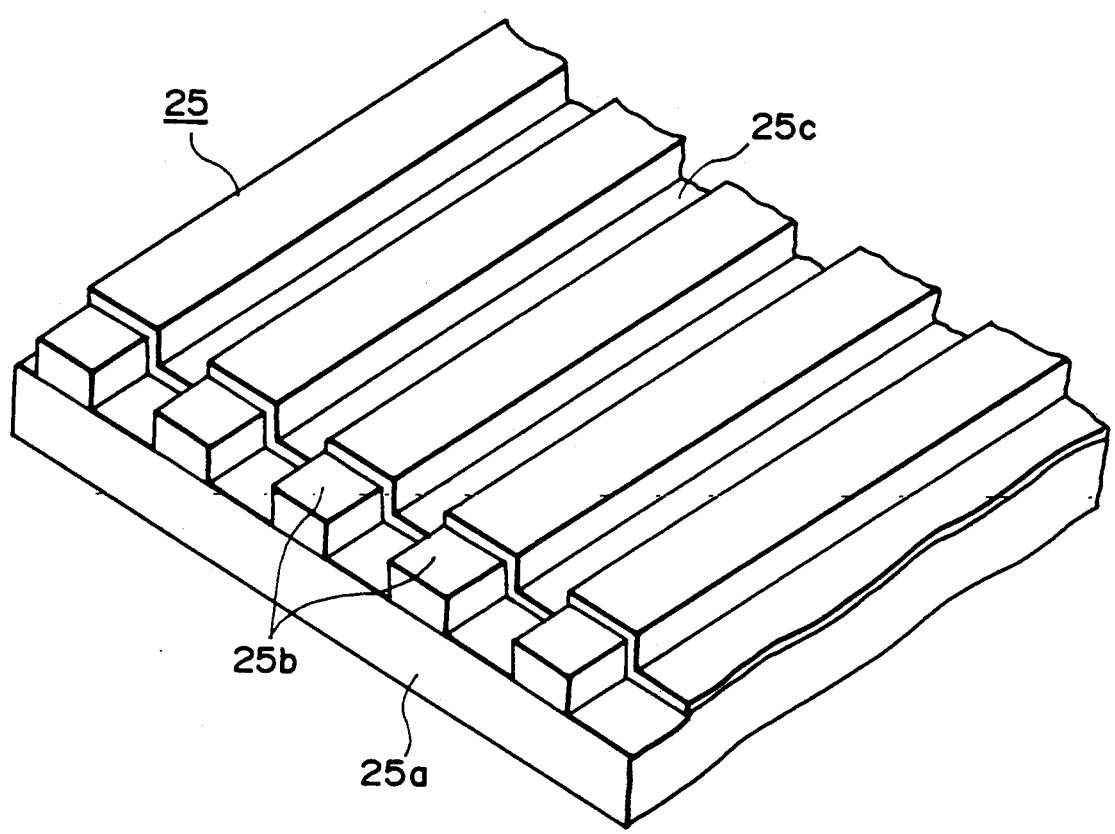
F I G. 5

RECORDING MATERIAL

FIELD OF THE INVENTION AND RELATED ART

The present invention relates to a recording material.

As peripheral equipment for recording used in conjunction with a computer, etc., there have been known various printers utilizing various recording systems, such as laser beam printers, ink-jet printers, thermal transfer printer, wire dot printer and daisy-wheel printer.

With respect to such a recording system, our research group has proposed a recording method wherein a pattern of adhesiveness is chemically imparted to a specific ink and recording is effected by utilizing the resultant difference between the adhesiveness and non-adhesiveness in the ink (Japanese Patent Application No. 175191/1986, corresponding to U.S. patent application Ser. No. 075,045).

This recording method comprises:

providing a fluid ink which is capable of forming a fluid layer, substantially non-adhesive and capable of being imparted with an adhesiveness on application of an energy, forming a layer of the fluid ink on an ink-carrying member, applying a pattern of the energy corresponding to a given image signal to the ink layer to form an adhesive pattern of the ink, and transferring the adhesive pattern of the ink to a transfer-receiving medium to form thereon an ink pattern corresponding to the energy pattern applied.

However, the above-mentioned recording method is not necessarily suitable for printing for mass-producing printed matter, in view of the printing cost, etc.

On the other hand, as the technique suitable for the mass-production printing, there have been known various printing processes such as planographic printing, letterpress printing, and gravure printing. However, in these conventional printing processes, the production of a printing plate requires complicated steps and the patterning of an ink requires dampening water, whereby the handling thereof is considerably troublesome. Further, because the adhesion property of the ink is easily affected by temperature or humidity, the above-mentioned printing processes are lacking in environmental stability. Accordingly, it is difficult to apply the conventional printing processes to the peripheral recording equipment used in conjunction with a computer, etc.

Our research group has also proposed some printing processes including one using a solid ink (U.S. patent application Ser. No. 270,070), and one wherein an ink is supplied to a printing plate by changing the pH value in the ink (U.S. patent application Ser. No. 287,151).

Further, our research group has proposed a printing process and a recording material wherein a voltage is applied to the recording material so as to change its adhesiveness, whereby a recording is effected (U.S. patent application Ser. No. 301,146).

This printing process comprises the steps of:

providing a recording material capable of changing its adhesiveness corresponding to the polarity of a voltage applied thereto;

supplying the recording material between a pair of electrodes; and applying a voltage between the pair of electrodes thereby to attach the recording material to either one of the pair of electrodes.

Further, the recording material used for this printing process comprises a liquid dispersion medium and fine particles dispersed therein, at least a part of the fine particles comprising charged or chargeable fine particles.

Our research group has further improved the above-mentioned printing process and proposed a printing process wherein an ink remaining on the surface of a roller of a printing device is removed therefrom (U.S. patent application Ser. No. 325,986).

The adhesiveness control characteristic of the recording material to be used in the above-mentioned printing process under application of a voltage can be improved by mixing an electrolyte in a liquid dispersion medium constituting the recording material, whereby an image recording step using the recording material, as described hereinafter, can be smoothly conducted. More specifically, while the above-mentioned recording material or ink is one showing ionic conductivity, when a predetermined amount of an electrolyte is contained in the liquid dispersion medium, the ink can efficiently cause an electrode reaction and can efficiently assume adhesiveness control as described below.

As such an electrolyte, a substance providing a halogen ion is generally used. However, the halogen ion is not necessarily preferred, because it can be converted into a gas on the anode side or can produce colored deposition to color a recording medium (or medium to be recorded).

SUMMARY OF THE INVENTION

A principal object of the present invention is to provide a recording material which is capable of efficiently effecting image recording under application of a voltage and provides substantially no halogen ion even under application of a voltage.

According to the present invention, there is provided a recording material comprising at least a liquid dispersion medium and an electrolyte contained therein; the electrolyte providing substantially no halogen ion in the liquid dispersion medium under electrolytic dissociation; the recording material being capable of changing its adhesiveness when imparted with a voltage by means of a pair of electrodes, thereby to selectively adhere to either one of the pair of electrodes.

The present invention also provides an image forming method comprising:

providing the above-mentioned recording material;

supplying the recording material between a pair of electrodes, at least one of which is a plate comprising an electroconductive portion and an insulating portion; and applying a voltage between the pair of electrodes so that the plate may be a cathode thereby to attach the recording material to the insulating portion of the plate.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic side sectional view of an apparatus for practicing image formation by using the ink according to the present invention;

FIG. 2 is a schematic perspective showing an embodiment of the printing plate for use in the apparatus shown in FIG. 1;

FIG. 5 is an enlarged schematic perspective view showing an embodiment of the recording electrode used in the apparatus shown in FIGS. 3 and 4.

DETAILED DESCRIPTION OF THE INVENTION

Figure 3:
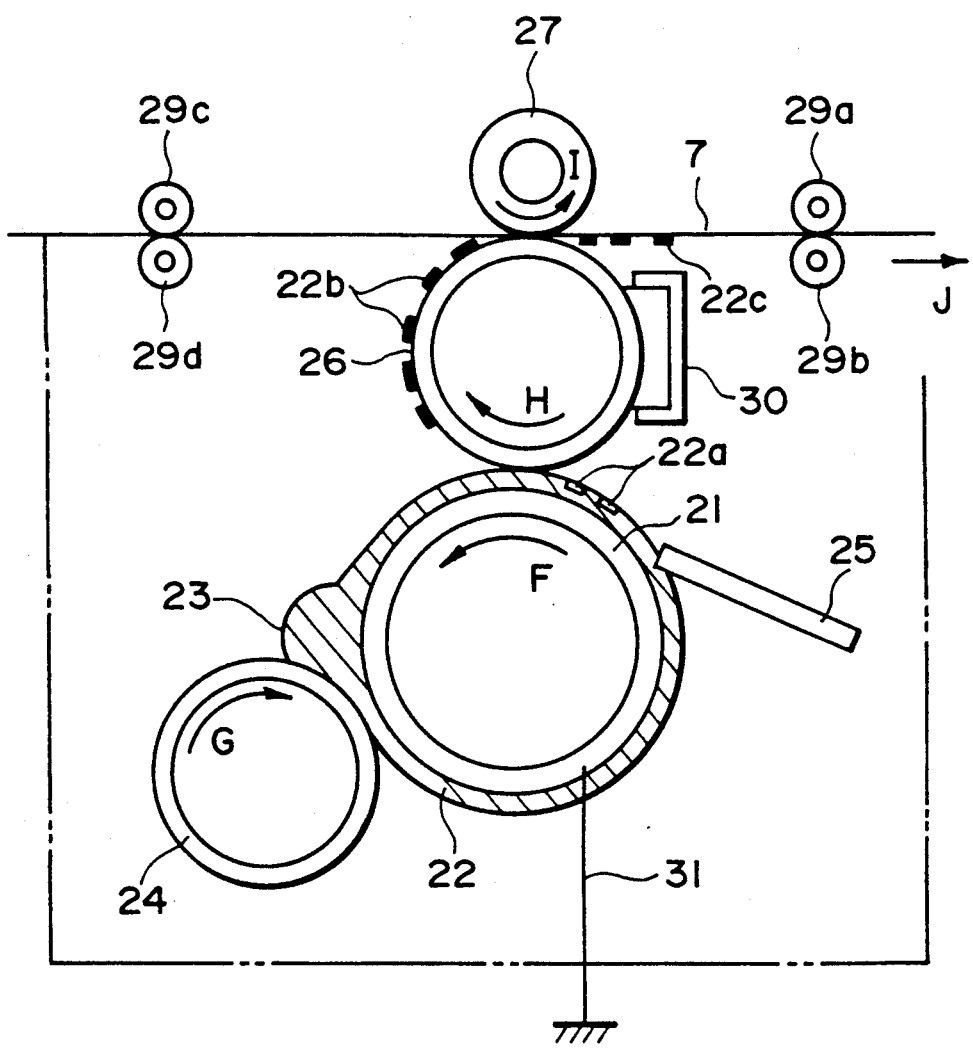
FIG. 3 is a schematic side sectional view of another apparatus for practicing image formation by using the ink according to the present invention.

The recording material according to the present invention comprises at least a liquid dispersion medium and an electrolyte. As specifically described hereinafter, the recording material according to the present invention may be used under the application of a voltage.

The recording material according to the present invention may be classified into the following two types.

(I) A type wherein the recording material has an adhesiveness under no voltage application, and the recording material loses its adhesiveness when a voltage is applied thereto.

(II) A type wherein the recording material has substantially no adhesiveness under no voltage application, and the recording material has an adhesiveness when a voltage is applied thereto.

The adhesiveness of the recording material may easily be controlled by regulating the kind and/or mixing proportion of respective components. For example, the adhesiveness of the recording material may be decreased by incorporating therein a larger amount of fine particles, and the adhesiveness may be increased by increasing the amount of the liquid dispersion medium contained therein. Further, in the case of a recording material containing a crosslinked substance as described hereinafter, the adhesiveness may be controlled by regulating the degree of the crosslinking thereof.

In a case where the recording material according to the present invention changes from an adhesive state to a non-adhesive state under application of a voltage, it is considered that the change may be attributable to a gas which is produced when the recording material is electrolyzed by electric conduction. In other words, it is considered that since the gas is produced at the interface between the recording material and an electrode, the recording material is released from the electrode. Accordingly, the recording material according to the present invention may comprise at least an electrolyte and a liquid dispersion medium capable of being electrolyzed under electric conduction.

In the present invention, the liquid dispersion medium may preferably be one which is less liable to be changed due to an external factor such as evaporation in an image recording process, and is capable of easily dissolving an electrolyte. A preferred example of the liquid dispersion medium is one comprising a polyhydric alcohol (or polyol)-type solvent.

In a case where the polyhydric alcohol-type solvent is used for the recording material, even when the temperature of the recording material becomes high at the time of image formation and water content contained in the recording material is evaporated to some extent, the polyhydric alcohol-type solvent is less liable to be evaporated, whereby the electric conductivity of the recording material per se is little changed. Accordingly, in such a case, the effect of heat on the resultant image quality is reduced, even when the recording material is used for an image forming method wherein the adhesiveness thereof is controlled by electric conduction.

More specifically, in order to stably effect image recording, it is desirable to keep the electric conductivity of the recording material constant. However, when the liquid dispersion medium is subjected to evaporation, etc., during an image recording step, the electric conductivity of the recording material is decreased. Therefore, the liquid dispersion medium may preferably be one which is stable to environmental change, etc. In a case where a polyhydric alcohol-type solvent is incorporated in the recording material as a liquid dispersion medium and an electrolyte is dissolved in the solvent, the polyhydric alcohol-type solvent remains even when the water content contained in the recording material is evaporated in an image recording process. As a result, the electrolyte contained in the polyhydric alcohol-type solvent prevents the electric conductivity of the recording material from considerably decreasing, whereby good sensitivity can be retained.

Examples of the polyhydric alcohol-type solvent to be used as a liquid dispersion medium used in the recording material according to the present invention may include: ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, dipropylene glycol, hexylene glycol, glycerin, 1,2,6-hexanetriol, diacetin, etc. These polyhydric alcohol-type solvents may be used singly or as a mixture of two or more species as desired.

The liquid dispersion medium may preferably be contained in an amount of 40–95 wt. %, more preferably 60–85 wt. %, based on the total weight of the ink. The polyhydric alcohol-type solvent may be used in a mixture thereof and another liquid dispersion medium, as desired. In such a case, the total liquid dispersion medium in the recording material may preferably comprise 10–100 wt. %, more preferably 30–90 wt. % of a polyhydric alcohol-type solvent.

Another liquid dispersion medium usable in the present invention may generally comprise water, but may be appropriately be selected from other solvents. Specific examples of such a solvent may include: triethanolamine, formamide, dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric amide, 2-nitropropane, nitroethane, δ-butyrolactone, propylene carbonate, etc. These compounds may be used singly or as a mixture of two or more species as desired.

In a case where sensitive recording is required by using a small quantity of energy, water or an aqueous solvent may preferably be used as the liquid dispersion medium, because hydrogen gas is liable to be generated at the cathode side. When water is mixed in the ink, the water content may preferably be 1–80 wt. %, more preferably 5–60 wt. %, based on the weight of the ink.

In the present invention, there is used an electrolyte which provides substantially no halogen ion even when subjected to electrolysis. More specifically, an electrolyte sample is dissolved in water at 25° C. so as to provide a concentration at 0.1 mol/l, and a DC voltage of 5 V is applied to the resultant solution for 10 min. by means of two platinum electrodes (1 cm × 1 cm) which are disposed to provide a space of 2 cm therebetween. Through the measurement, the electrolyte used in the present invention may preferably be one such that the amount of the halogen gas generated at the anode does not exceed a tolerance (e.g., 1 ppm or below in the case of halogen gas).

The electrolyte used in the present invention may preferably be one which is less liable to be deposited even when subjected to electrolysis, and may ensure an electric conductivity such that it enables smooth adhesiveness control of the recording material under voltage application. More specifically, an electrolyte (sample is dissolved in 100 g of water of 25° C. so as to provide a saturated solution, and the resistivity of the resultant solution is measured. Through the measurement, the electrolyte used in the present invention may preferably be one which provides a resistivity of 5 ohm.cm to $10^5$ ohm.cm, more preferably 5 ohm.cm to $10^4$ ohm.cm.

Specific examples of the electrolyte usable in the present invention may include: alkylsulfuric acid salts, laurylsulfuric acid salts, higher alcohol sulfuric acid salts, succinic acid salts, carboxylic acid salts, polyethylene glycol ether sulfuric acid ester salts, amidosulfuric acid salts, disulfonic acid salts, polyoxyethylene lauryl ether sulfuric acid salts, polyoxyethylene alkyl ether acetic acid salts, alkylphosphoric acid salts, polyoxyethylene alkyl ether phosphoric acid salts, alkylammonium salts, alkylbenzylammonium salts, perfluoroalkylsulfonic acid salts, perfluoroalkylammonium salts, perfluoroalkylcarboxylic acid salts, polyoxyethylene-alkylphenyl ether sulfuric acid salts, alkanesulfonic acid salts, sulfuric acid ester salts, phosphoric acid ester, etc. Among these, preferred examples may include: tetrafluoroborates (or borofluorides) such as lithium borofluoride ($LiBF_4$), hexafluorophosphates such as sodium hexafluorophosphate ($NaPF_6$), and ammonium hexafluorophosphate ($NH_4PF_6$), acetates such as sodium acetate ($CH_3COONa$), etc. These electrolytes may be used singly, or as a mixture of two or more species, as desired, or as a mixture with another electrolyte. Lithium borofluoride is particularly preferred.

In a case where a mixture of an electrolyte providing substantially no halogen ion and another electrolyte is used, it is preferred to use the latter electrolyte so that the weight thereof is ½ times or less that of the former electrolyte (i.e., the electrolyte providing substantially no halogen ion). The amount of the electrolyte providing substantially no halogen ion to be used in the recording material may preferably be 0.05 wt. part to the saturation solubility thereof (i.e., an amount of the electrolyte providing a saturated solution at 25° C., 1 atm.), more preferably 0.1 wt. part to the saturation solubility, particularly preferably 1.0 wt. part to the saturation solubility, with respect to 100 parts of the liquid dispersion medium. If the amount of the above-mentioned electrolyte is smaller than 0.05 wt. part, the resultant electric conductivity cannot sufficiently be increased. If the amount of the electrolyte is larger than the saturation solubility, the electrolyte not being dissolved in the solvent is deposited, whereby the recording material undesirably becomes heterogeneous.

The recording material according to the present invention may also be one in the form of a gel, in a broad sense, which comprises the above-mentioned liquid dispersion medium and a crosslinked substance impregnated with the liquid dispersion medium.

Herein, the "crosslinked substance" refers to a single substance which per se can assume a crosslinked structure, or a mixture of a substance capable of assuming a crosslinked structure with the aid of an additive such as a crosslinking agent for providing an inorganic ion such as borate ion, and the additive. Further, the term "crosslinked structure" refers to a three-dimensional structure having a crosslinkage or crosslinking bond. The crosslinkage may be composed of any one or more of covalent bond, ionic bond, hydrogen bond and van der Waal's bond.

In the recording material of the present invention, the crosslinked structure is only required to be such that a desired degree of liquid dispersion medium-retaining property is given thereby. More specifically, the crosslinked structure may be any one of a network, a honeycomb, a helix, etc., or may be an irregular one.

In the present invention, the crosslinked substance may preferably be composed of or from a high polymer (or macromolecular substance), particularly a natural or synthetic hydrophilic high polymer.

Examples of such a polymer include: plant polymers, such as guar gum, locust bean gum, gum arabic, tragacanth, carrageenan, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinyl pyrolidone, polyvinyl methyl ether, carboxyvinyl polymer, and sodium polyacrylate; and other synthetic polymers, such as polyethylene glycol, ethylene oxide-propylene oxide block copolymer. These polymers may be used singly or in mixture of two or more species, as desired.

The above-mentioned hydrophilic polymer may preferably be used in a proportion of 0.2–50 wt. parts, particularly 0.5–30 wt. parts, with respect to 100 wt. parts of the liquid dispersion medium.

The above-mentioned type of a recording material capable of changing from a non-adhesive state to an adhesive state under application of a voltage may be obtained by incorporating therein the above-mentioned crosslinked substance. When an energy due to electric conduction is imparted to the recording material comprising a crosslinked substance impregnated with a liquid dispersion medium containing an electrolyte, it is presumably considered that the crosslinked structure of the recording material changes, whereby an adhesiveness is imparted to the recording material.

According to our knowledge, e.g., when a polyvinyl alcohol crosslinked with borate ions is used as the crosslinked substance, the change in the crosslinked structure caused by a pH change due to electric conduction may be considered as follows.

Thus, when the borate ion bonded to the —OH group of the polyvinyl alcohol,

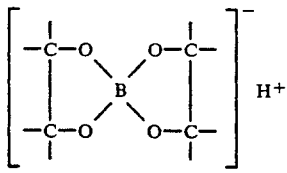

is subjected to an anodic reaction in the vicinity of an anode under electric conduction and the liquid dispersion medium is electrolyzed (or to the addition of an electron acceptor such as hydrochloric acid), the pH of the ink is changed to the acidic side and electrons may be removed to destroy at least a part of the crosslinked structure, whereby the ink may be imparted with an adhesiveness selectively or imagewise. The reaction at this time may presumably be expressed by the following formula:

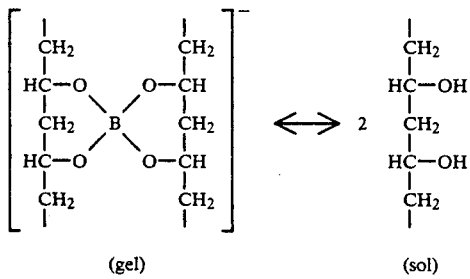

The above-mentioned sol-gel transition may be caused by a pH change, and the gelation is promoted along with a pH increase and the solation is promoted along with a pH decrease, while it varies depending on the polymerization degree or saponification degree of the polyvinyl alcohol, and the amount of the borate ion.

The crosslinked substance used in the present invention can form a crosslinked structure by itself e.g., based on its polymer characteristic, but can be used in combination with a crosslinking agent (or gelling agent) for more positively crosslinking the crosslinked substance in order to improve the ink characteristics when supplied with or not supplied with energy.

A preferred class of the crosslinking agent may be ionic crosslinking agents, including: various salts such as $CuSO_4$; boric acid source compounds capable of generating borate ions in water, such as borax and boric acid. When such an ionic crosslinking agent is used, it becomes easy to selectively provide the ink with an adhesiveness through an electrochemical reaction involving transfer of electrons or a pH change. As a result, the use of such an ionic crosslinking agent is preferred in order to suppress the consumption of a pattern of energy. The ionic crosslinking agent may preferably be used in a proportion of 0.05-3 wt. parts, particularly 0.1-1.5 wt. parts, per 100 wt. parts of the crosslinked substance.

Instead, a crosslinking agent utilizing a crosslinking bond such as glyoxal or dialdehydebenzene can also be used.

The recording material according to the present invention may further contain inorganic or organic fine particles. The fine particles contained in the recording material may improve the cutting property of the recording material so as to improve the resolution of the resultant image.

Examples of the fine particles to be contained in the recording material according to the present invention include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2Si_2O_5$, mesobisilicic acid $H_4Si_3O_3$, and mesotetrasilicic acid $H_6Si_4O_{11}$; polyamide resin particles; polyamide-imide resin particles; iron hydroxide particles, aluminum hydroxide particles, fluorinated mica particles, polyethylene particles, motmorillonite particles, fluorine-containing resin particles; and other particles such as colloidal silica, fluorinated carbon (or carbon fluoride), titanium oxide, and carbon black.

Further, polymer particles containing various charge-controlling agents used as electrophotographic toners may be used for such a purpose.

The above-mentioned fine particles may generally have an average particle size of 100 microns or smaller, preferably 0.1-20 microns, more preferably 0.1-10 microns. In a case where the above-mentioned fine particles are contained in the recording material, the fine particles may generally be contained in the recording material in an amount of 1 wt. % or more, preferably 3-90 wt. %, more preferably 5-60 wt. %.

In a preferred embodiment of the present invention, in view of the viscoelastic characteristic of the recording material, the entirety or a part of the fine particles comprise swelling particles (i.e., particles capable of being swelled) which are capable of retaining the above-mentioned liquid dispersion medium therein.

Examples of such swelling particles may include: fluorinated mica such as Na-montmorillonite, Ca-montmorillonite, 3-octahedral synthetic smectites, Na-hectorite, Li-hectorite, Na-taeniolite, Na-tetrasilicic mica and Li-taeniolite; synthetic mica, silica, etc.

The above-mentioned fluorinated mica may be represented by the following general formula (1).

$$W_{1-1/3}(X,Y)_{2.5-3}(Z_4O_{10})F_2 \qquad (1),$$

wherein W denotes Na or Li; X and Y respectively denote an ion having a coordination number of 6, such as $Mg^{2+}$, $Fe^{2+}$, $Ni^2$, $Mn^{2+}$, $Al^{3+}$, and $Li^+$; Z denotes a positive ion having a coordination number of 4, such as $Al^{3+}$, $Si^{4+}$, $Ge^{4+}$, $Fe^{3+}$, $B^{3+}$, or a combination of these including, e.g., ($Al^{3+}/Si^{4+}$).

The swelling particles, in its dry state, may preferably have an average particle size of 100 microns or smaller, more preferably 1-20 microns, particularly preferably 1-10 microns.

In the present invention, in order to control the viscosity of the recording material, a polymer soluble in the above-mentioned liquid dispersion medium may be contained in an amount of 1-90 wt. % (percentage), more preferably 1-50 wt. %, particularly preferably 1-20 wt. % based on the recording material.

Examples of such polymer include: plant polymers, such as guar gum, locust bean gum, gum arabic, tragacanth, carrageenan, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and a liquid polymer such as polybutene.

The recording material according to the present invention may contain, as desired, a colorant comprising a dye or pigment generally used in the field of printing or recording, such as carbon black. When the recording material contains a colorant, the colorant content may preferably be 0.1–40 wt. %, more preferably 1–20 wt. %, based on the recording material. Instead of or in combination with the colorant, a color-forming compound capable of generating a color under voltage application can be contained in the recording material. The recording material may further contain a thickening agent (or viscosity improver), a viscosity-reducing agent, or a surfactant, etc. It is also possible to cause the above-mentioned fine particles per se to function as a colorant.

More specifically, there may be used, as a colorant, colored fine particles obtained by dispersing a dye or pigment in a natural or synthetic resin and forming the resultant resin into fine particles (e.g., toner particles used in electrophotography having various colors).

The recording material according to the present invention may be obtained by simply mixing respective components constituting the recording material. The recording material comprising a crosslinked substance may be obtained by uniformly mixing a liquid dispersion medium such as glycol, and a crosslinked substance under heating as desired, to form a viscous solution or dispersion, which is then cooled to be formed into a gel state.

Next, there is described an image recording method using the recording material according to the present invention, with reference to the accompanying drawings.

Referring to FIG. 1, an ink-carrying roller 1 is a cylindrical member rotating in the direction of arrow A. The roller 1 may preferably comprise an electroconductive material such as aluminum, copper and stainless steel. Onto the cylindrical ink-carrying surface of the roller 1, an ink 2 as a recording material according to the present invention is supplied by means of a coating roller 9 rotating in the direction of arrow E to be formed into a layer having a uniform thickness. The recording material used herein is one which has an adhesiveness under no voltage application, and loses its adhesiveness on the cathode side under application of a voltage.

The cylindrical ink-carrying surface of the roller 1 may be composed of any material, as far as it is possible to form a desired layer of the ink 2 when it is rotated in the direction of arrow A. More specifically, the roller surface may preferably be composed of a conductive material such as metal including stainless steel. The ink-carrying roller 1 is connected to one of the terminals of the DC power supply 11.

The surface composed of such a material of the ink-carrying roller 1 can be smooth but may preferably be a roughened one to an appropriate extent (e.g., a roughness of the order of 1S according to JIS B 0601) so as to enhance the conveying and carrying characteristics.

In contact with the ink layer 2 disposed on the ink-carrying roller 1, a printing plate 4 wound about a plate roller 3 is disposed. The printing plate 4 may for example comprise a substrate 4a comprising an electroconductive material such as metal, and a desired pattern 4b disposed thereon comprising an insulating material, as shown in FIG. 2.

Referring to FIG. 2, the material constituting the surface of the substrate 4a may include: metals such as aluminum, copper, stainless steel, platinum, gold, chromium, nickel, phosphor bronze, and carbon; electroconductive polymers; and dispersions obtained by dispersing metal filler, etc., in various polymers. The material constituting the pattern 4b may include: materials for thermal transfer recording, electrophotographic toner images; natural or synthetic polymers such as vinyl polymer.

Thus, when a voltage is applied between the plate 4 and the ink-carrying roller 1 by means of the power supply 11, the ink is not attached to the electroconductive portion of the plate but is selectively attached to the pattern 4b. The voltage applied from the power supply 11 may practically be a DC voltage of 10–100 V, more preferably 5–50 V. When an AC bias voltage preferably of 10–100 V in the form of a high frequency (preferably of 10 Hz–100 KHz) is further applied, the image quality may be higher in sharpness.

Incidentally, while the printing plate 4 side is a cathode and the ink-carrying roller 1 side is an anode in FIG. 1, the printing plate 4 side may be an anode and the ink-carrying roller 1 side may be a cathode depending on the property or state of an ink used in combination therewith.

In the present invention, it is preferred that the voltage from the power supply 11 is applied between the rotation axes of the plate roller 3 and the ink-carrying roller 1.

The thickness of the layer of the ink 2 formed on the ink-carrying roller 1 can vary depending on various factors including the gap between the ink-carrying roller 1 and the coating roller 9, the fluidity or viscosity of the ink 2, the surface material and surface roughness of the ink-carrying roller 1, and the rotational speed of the roller 1, but may preferably be about 0.001–5 mm as measured at an ink transfer position where the roller 1 is disposed opposite to the pattern plate 4 disposed on the plate roller 3.

If the layer thickness of the ink 2 is below 0.001 mm, it is difficult to form a uniform ink layer on the ink-carrying roller 1. On the other hand, if the ink layer thickness exceeds 5 mm, it becomes difficult to convey the ink 2 while keeping a uniform peripheral speed of the surface portion on the side contacting the printing plate 4 having the electroconductive pattern, and further it becomes difficult to pass a current between the electroconductive pattern plate 4 and the ink-carrying roller 1.

The thus formed ink pattern on the printing plate 4 is then transferred to a blanket cylinder 5, which rotates in the direction of arrow C while contacting the printing plate 4 under pressure. Further, the ink pattern disposed on the blanket cylinder 5 is transferred to a recording medium (or a medium to be recorded) 7 such as a sheet of paper, cloth or metal, passing between the blanket cylinder 5 and an impression cylinder 6, which rotates in the direction of arrow D while contacting the blanket cylinder 5, whereby an image 8 corresponding to the above-mentioned ink pattern is formed on the recording medium 7.

It is also possible that the ink pattern formed on the printing plate 4 is directly transferred to the recording medium 7 in some cases without providing the blanket cylinder 5. However, when the blanket cylinder 5 is provided, the printing plate 4 may be prevented from wearing or deteriorating, the material constituting the blanket cylinder 5, and an image 8 having the same pattern as that of the printing plate 4 may be obtained on the recording medium 7.

In addition, the printing plate can be one comprising an electroconductive substrate and an insulating film disposed thereon wherein a conductivity pattern has been formed by electrical discharge destruction; or one comprising an electroconductive substrate and a photographic image disposed thereon having a conductive pattern of silver obtained by deposition of silver particles.

In the embodiments as shown in FIG. 1, the printing plate 4 is wound around the cylindrical plate roller 3, but it is also possible that the printing plate 4 in the form of a flat plate is used, as such, as an electrode, the ink according to the present invention applied onto the printing plate 4 is sandwiched between the plate 4 and an opposite electrode, and a voltage is applied to the ink in such a state, whereby an ink pattern is formed on the printing plate 4.

The ink 2 according to the present invention may preferably satisfy at least one of the following properties.

(1) Adhesiveness

A sample ink (reflection density: 1.0 or larger) is caused to adhere to a stainless steel plate of 1 cm × 1 cm in size coated with platinum plating which is vertically disposed, so that a 2 mm-thick ink layer is formed on the stainless steel plate, and is left standing as it is for 5 sec. in an environment of a temperature of 25° C. and a moisture of 60%. Then, the height of the ink layer is measured. Through the measurement, the ink according to the present invention may preferably be held on the stainless steel plate substantially. More specifically, the above-mentioned height of the ink layer may preferably be 50% or more, more preferably 80% or more, based on the original height thereof.

(2) Adhesiveness under no voltage application

A 2 mm-thick layer of a sample ink is sandwiched between two stainless steel plates each of 1 cm × 1 cm in size coated with platinum plating which are vertically disposed, and the stainless steel plates are separated from each other at a peeling speed of 5 cm/sec under no voltage application. Then, the areas of both plates covered with the ink are respectively measured. Through the measurement, in the ink according to the present invention, the respective plates may preferably show substantially the same adhesion amount of the ink. More specifically, each plate may preferably show an area proportion of 0.7–1.0, in terms of the proportion of the area measured above to the area of the plate which has originally been covered with the above-mentioned 2 mm-thick ink layer.

(3) Adhesiveness under voltage application

A sample ink (reflection density: 1.0 or larger) is applied on a stainless steel plate of 1 cm × 1 cm coated with platinum plating to form an about 2 mm-thick ink layer, and another stainless steel plate coated with platinum plating having the same size as described above is (after the reflection density thereof is measured) disposed on the ink layer, and these two stainless steel plates are vertically disposed. Then, a voltage of +30 V was applied between the above-mentioned two stainless steel plates sandwiching the 2 mm-thick ink layer, while one of the stainless steel plate is used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the reflection density of each stainless steel plate surface is measured to determine the increase in reflection density of the stainless steel plate. Through the measurement, in the ink according to the present invention, it is preferred that the coloring content of the ink is not substantially transferred to one of the above-mentioned two electrodes, and the ink selectively adheres to the other electrode. More specifically, with respect to the electrode to which substantially no ink adheres, the increase in the reflection density may preferably be 0.3 or smaller, more preferably 0.1 or smaller, when the above-mentioned ink per se has a reflection density of 1.0 or larger.

The above-mentioned viscosity of the ink may be appropriately controlled by selecting the kind of the dispersion medium. In the case of the recording material containing fine particles, the viscosity thereof may be controlled by selecting the kind, particle size or addition amount of the fine particles.

In order to cause the ink to generate a gas due to electrolysis, the electric resistance of the ink may preferably be as low as possible. More specifically, the volume resistivity of the ink may preferably be $10^5$ ohm.cm or below. If the volume resistivity exceeds $10^5$ ohm.cm, the quantity of electric conduction becomes too small, or a high voltage is required in order to prevent a decrease in the quantity of electric conduction.

In the present invention, the electric resistance of the ink was measured by means of a measurement device (Model: 4275A Multi Frequency LCR Meter, mfd. by Yokokawa Hewlett Packard K.K.) according to an AC two-electrode measurement. In the AC two-electrode measurement, the AC voltage used was 0.1 V and had a frequency of 10 MHz.

In an embodiment wherein the recording material according to the present invention is one in the form of a gel (in a broad-sense) containing a crosslinked substance, and a portion thereof supplied with a voltage is converted from a non-adhesive state into an adhesive state, a recording method as described below can also be effected.

Figure 4:
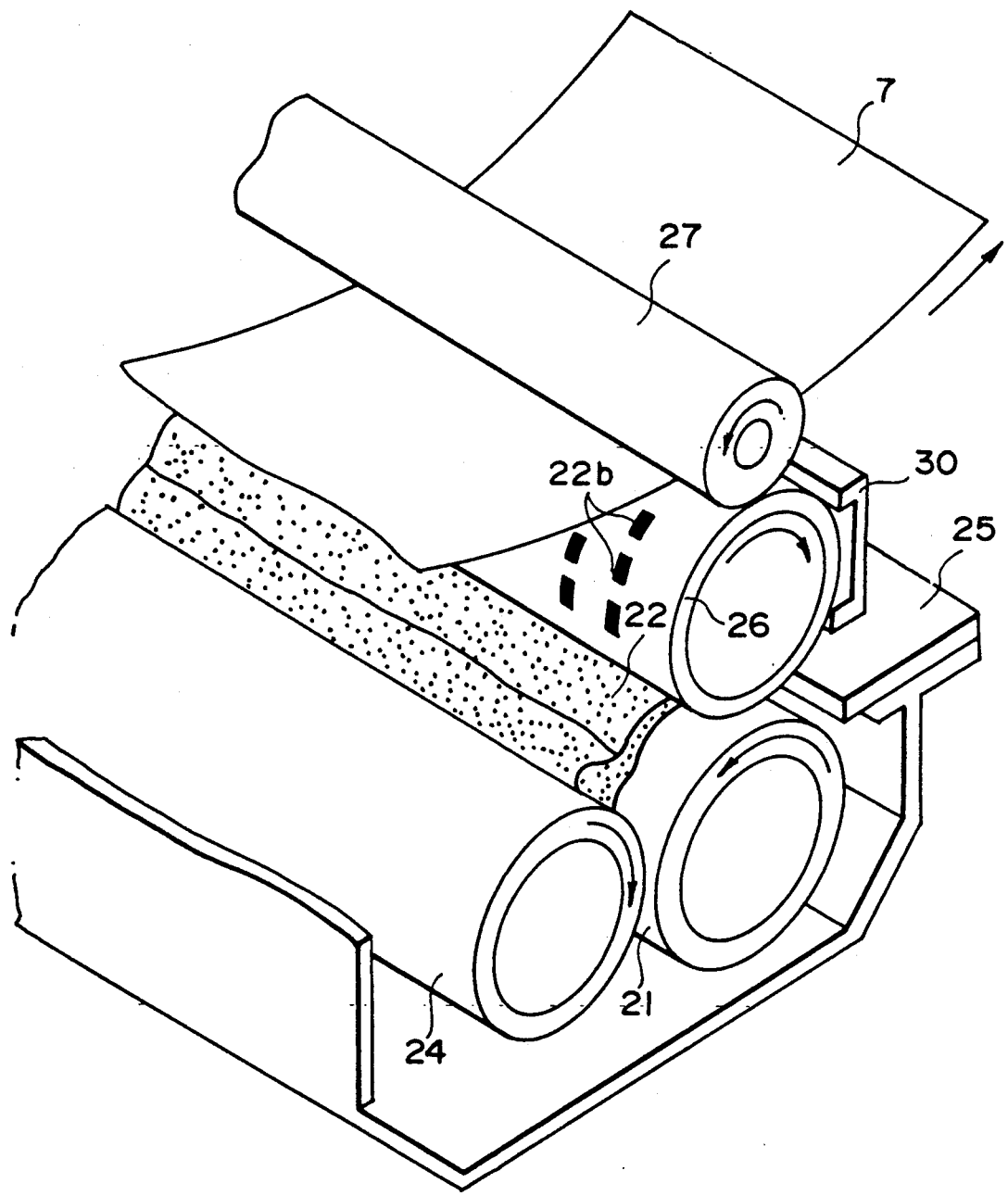
FIG. 4 is a schematic perspective view of the apparatus shown in FIG. 3.

Referring to FIGS. 3 and 4, an ink 22 in the form of a gel according to the present invention is carried on an ink-carrying roller 21 as an ink layer and conveyed along with the rotation in the arrow F direction of the roller 21. The ink 22 is formed into an ink layer having a predetermined thickness on the surface of the ink-carrying roller 21 by means of a coating roller 24 rotating in the direction of arrow G.

The ink 22 moved in this way is supplied with a pattern of voltage corresponding to an image signal from the recording electrode 25 at an energy application position where the ink 22 contacts the electrode 25. A current corresponding to the voltage flows between the recording electrode 25 and the ink-carrying roller 1 grounded by means of a ground lead 31 through the ink 22, whereby the ink 22 is selectively imparted with an adhesiveness to form an adhesive portion 22a.

The portion 22a selectively imparted with an adhesiveness is further moved in the direction of arrow F to reach an ink transfer position where the intermediate transfer roller 26 contacts the layer of the ink 22, and at least a portion of the ink 22 constituting the ink layer is transferred onto the intermediate transfer roller 26 rotating in the arrow H direction, on the basis of the above-mentioned selective adhesiveness, thereby to form an ink pattern 22b thereon.

The ink pattern 22b is then conveyed along with the direction of rotation in the arrow H of the intermediate transfer roller 26 to reach the ink pattern-transfer position where the roller 26 confronts the platen roller 27 by the medium of a recording medium 7 such as paper. At the ink pattern-transfer position, the ink pattern 22b formed on the intermediate transfer medium 26 is transferred to the recording medium 7 under a pressure exerted by the platen 27 rotating in the arrow I direction thereby to form a transferred image 22c.

The thus formed transferred image 22c is conveyed in the direction of arrow J together with the recording paper 7 by means of conveyor rollers 29a, 29b, 29c and 29d.

Further, the ink remaining on the surface of the intermediate transfer roller 26 after the transfer of the ink pattern 22b to the recording medium 7, may for example be removed, e.g., by a cleaning means 30, and the thus cleaned intermediate roller 26 is again provided for the formation of a new ink pattern 22b.

On the other hand, the remainder of the ink 22 not transferred onto the intermediate transfer roller 26 at the above-mentioned ink transfer position is further moved in the arrow F direction and is separated from the intermediate transfer roller 26 by gravity, etc., because of its non-adhesiveness to be returned into the ink reservoir 23 and reused because of its fluidity.

The fluid ink 22 returned to the ink reservoir 23 is stirred along with the rotation of the ink-carrying roller 21 in the direction of arrow F and the rotation of the coating roller 24 in the direction of arrow G, and is again formed into an ink layer having a predetermined thickness, whereby the ink 22 is again subjected to image recording according to the same process as described above.

Incidentally, in the above-mentioned ink pattern formation step, i.e., the step wherein the ink pattern 22b is formed on the basis of the selective transfer of the ink 22 to the intermediate transfer roller 26, at the point of separation between the intermediate transfer roller 26 and the ink layer, it is preferred to make the peripheral speed of the intermediate transfer roller 26 smaller than (or equal to) the peripheral speed of the ink-carrying roller 21 so as to apply to the ink layer a shear force based on the difference in peripheral speed, in respect to stabilization of separation of the ink layer and the intermediate transfer roller 26.

In such an embodiment, it is presumed that the ink is not substantially transferred to the intermediate transfer roller 26 under no energy application because the ink 22 is one in the form of a gel, in a broad sense, wherein the liquid dispersion medium is retained in the crosslinked substance.

FIG. 5 shows an embodiment of the recording electrode 25. With reference to FIG. 5 which is an enlarged partial perspective view, the recording electrode 25 may be obtained by forming a plurality of electrode elements 25b of a metal such as platinum and gold on a substrate 25a, and coating the electrode elements 25b except for the tip portions thereof contacting the ink with an insulating film 25c of polyimide, etc. The electrode elements 25b may preferably comprise an electroless plating of platinum in view of the durability and adhesion with the substrate 25a.

In an embodiment already explained with reference to FIG. 3, a current is passed between the recording electrode 25 and the ink-carrying roller 21, but it is also possible to pass a current between an adjacent pair of the plurality of electrode elements 25b on the recording electrode 25.

In a case where the recording material according to the present invention is used for the above-mentioned recording method explained with reference to FIG. 3, the recording material may preferably be one having the following layer-forming property and non-adhesiveness.

(1) Layer-forming property

The ink of the present invention may preferably have a layer-forming property such that it can be formed into a layer or film form, e.g., on an ink-carrying member.

More specifically, the ink of the present invention may preferably be formed into an ink layer having a thickness of about 0.01–100 mm, when it is carried on an ink-carrying roller at stainless steel (surface roughness: 1S) with a diameter of 200 mm rotating at 5 rpm.

(2) Non-adhesiveness (or liquid dispersion medium-retaining ability)

On the surface of a sample ink held in a container, an aluminum foil of 5 cm × 5 cm in size is, after being accurately weighed, placed gently and is left standing as it is for 1 min. in an environment of a temperature of 25° C. and a moisture of 60%. Then, the aluminum foil is gently peeled off from the surface of the ink and then quickly weighed accurately to measure the increase in weight of the aluminum foil. Through the measurement, the ink of the present invention should preferably show substantially no transfer of its solid content and a weight increase of the aluminum foil of about 0–1000 mg, particularly on the order of 0–100 mg. In the above measurement, it is possible to gently separate the aluminum foil from the fluid ink body, if necessary, with the aid of a spatula.

If the non-adhesiveness of the ink used in the present invention is insufficient in light of the above standard, the ink per se can transfer to an intermediate roller, etc., to a practically non-negligible extent even in a portion supplied with no electric conduction whereby the image quality is lowered.

In view of the above-mentioned layer-forming property, the liquid dispersion medium may preferably contain water. In such a case, the mixing proportion of water may preferably be 0–35 wt. % (more preferably 10–20 wt. %) and the mixing proportion of a polyhydric alcohol type solvent may preferably be 40-90 wt. % (more preferably 45-70 wt. %), based on the total weight of the ink.

If the mixing proportion of water is too small, the electric resistance of the ink is increased and the sensitivity is decreased, whereby the resultant image density can decrease in some cases. If the mixing proportion of water is too large, non-selective transfer can undesirably occur. If the mixing proportion of the polyhydric alcohol-type solvent is too small, the viscosity of the ink is increased to decrease the layer-forming property of the ink. If the mixing proportion of the polyhydric alcohol-type solvent is too large, the viscosity of the ink is decreased, whereby the ink surface is disturbed by the contact of a recording electrode 25 as shown in FIG. 3 to invite image quality deterioration.

Hereinbelow, the present invention will be explained with reference to Examples.

EXAMPLE 1

200 g of glycerin and 140 g of lithium taeniolite (LiMg$_2$Li(Si$_4$O$_{10}$)F$_2$) having an average particle size of 2.5 microns were kneaded in a homogenizer at 10,000 rpm for 30 min., and then 200 g of water, 10 g of LiBF$_4$ and 25 g of a cyan colorant (Supranol Cyanine 7BF, mfd. by Bayer) were added thereto and mixed by means of a roll mill to prepare a colloid sol ink in the form of an amorphous solid.

The thus obtained ink was applied on a stainless steel plate or board of 1 cm×1 cm plated with platinum to form an about 2 mm-thick ink layer, and another stainless steel plate plated with platinum having the same size as described above was disposed on the ink layer. Then, these two stainless steel plates were disposed vertically. Under no voltage application, when the spacing between these two stainless steel plates was gradually increased to separate these two stainless steel plates from each other, it was found that the ink adhered to almost the whole areas of the respective plates.

Then, a voltage of +30 V was applied between the above-mentioned two stainless steel plates plated with platinum sandwiching the 2 mm-thick ink layer, while one of the stainless steel plate was used as a cathode (earth) and the other was used as an anode. When the spacing between these two stainless steel plates was gradually increased to separate these two stainless steel plates from each other, while applying the voltage in the above-mentioned manner, it was found that substantially all of the ink adhered to the anode while substantially no ink adhered to the cathode, when these electrodes were observed with the naked eye. Further, the above-mentioned ink showed an electric conductivity of 280 ohm.cm.

Then, image formation was effected by means of a printing apparatus as shown in FIG. 1, wherein an ink-carrying roller 1 comprising a cylindrical roller of 30 mm in diameter having a stainless steel surface coated with platinum plating (surface roughness: 1S) and a plate roller 3 comprising an iron cylindrical roller of 30 mm in diameter having a surface coated with hard chromium plating were used. In this apparatus, a printing plate 4 having an electroconductive pattern which comprised a copper plate and an electrically insulating polymer image of a vinyl-type resin disposed thereon was wound about the plate roller 3, and the above-mentioned ink material was disposed between the ink-carrying roller 1 and a coating roller 9.

The ink-carrying roller 1 was rotated in the direction of arrow A at a peripheral speed of 5 mm/sec, and the gap between the ink-carrying roller 1 and the coating roller 9 comprising a cylindrical roller having a teflon rubber surface and rotating in the direction of arrow E at a peripheral speed of 5 mm/sec was controlled so that a 0.2 mm-thick ink layer was formed on the ink-carrying roller 1. The plate roller 3 was rotated in the direction of arrow B at a peripheral speed of 5 mm/sec in contact with the ink layer formed on the ink-carrying roller 1.

When printing operation was conducted by using such printing device, while no voltage was applied from a DC voltage supply 11, a printed matter having an imagewise pattern was not obtained. On the other hand, when the printing operation was conducted while a DC voltage of 30 V was applied from the DC voltage supply 11, a large number of printed matters having a sharp image quality were obtained. In this printing operation, the plate roller 3 was used as a cathode and the ink-carrying roller 1 was used as an anode.

During the above-mentioned printing operation, neither the production of a gas at the ink-carrying roller 1 (anode) or the printing plate 4 (cathode), nor deposition of a substance on the ink-carrying roller 1 or the printing plate 4 was observed. Further, a sensitivity decrease due to a change in the electric conductivity was not observed. The production of the gas was evaluated by disposing a gas detector (one for detecting hydrogen fluoride, mfd. by Gastec Co.) close to the clearance between the ink-carrying roller 1 and the plate roller 3 at room temperature (25° C.) under a windless condition. The same method was adopted in Examples and Comparative Examples appearing hereinafter.

EXAMPLE 2

600 g of glycerin, 300 g of water, 50 g of carbon black (pigment, Stering SR, mfd. by Cabot Co., U.S.A.), and 100 g of polyvinyl alcohol (Gohsenol KP-08, mfd. by Nihon Gosei Kagaku Kogyo K.K.) were kneaded at 80° C. to dissolve the polyvinyl alcohol, and then 100 g of lithium taeniolite and 30 g of LiBF$_4$ were added thereto and mixed by means of a roll mill to prepare an ink in the form of an amorphous solid.

When the thus obtained ink was subjected to image formation in the same manner as in Example 1, a large number of printed matters having a sharp image quality similar to those obtained in Example 1 were obtained.

EXAMPLE 3

| | |
|---|---|
| Anhydrous colloidal silicate (swelling fine particles, trade name: Sumecton, mfd. by Kunimine Kogyo K.K., average particle size: below 1 micron) | 250 wt. parts |
| Carbon black (Stering SR, mfd. by Cabot Co., U.S.A.) | 60 wt. parts |
| Water | 140 wt. parts |
| Glycerin | 280 wt. parts |

Among the above-mentioned ingredients, water, glycerin and carbon black were first mixed by means of an attritor for 4 hours to prepare a mixture liquid, and then anhydrous colloidal silicate and 50 g of NaPF$_6$ were mixed therewith by means of a kneader to obtain an ink according to the present invention.

When the thus obtained ink was subjected to image formation in the same manner as in Example 1, a large number of printed matters having a sharp image quality similar to those obtained in Example 1 were obtained.

EXAMPLE 4

An ink according to the present invention was prepared in the same manner as in Example 1 except that 10 g of $NH_4PF_6$ was used instead of 10 g of $LiBF_4$ used in Example 1. The thus prepared ink showed an electric conductivity of 444 ohm.cm.

The above-mentioned ink was subjected to the same adhesiveness test as in Example 1 by using stainless steel plates coated with platinum plating. As a result, similar results as in Example 1 were obtained under no voltage application and under voltage application.

When the ink was subjected to a printing operation by means of the printing device used in Example 1, a large number of printed matters having a sharp image quality were obtained.

During the above-mentioned printing operation, neither the production of a gas nor deposition of a substance on the anode of the ink-carrying roller 1 was observed. Further, a sensitivity decrease due to a change in the electric conductivity was not observed.

EXAMPLE 5

An ink according to the present invention was prepared in the same manner as in Example 1 except that 10 g of $CH_3COONa$ was used instead of 10 g of $LiBF_4$ used in Example 1. The thus prepared ink showed an electric conductivity of 403 ohm.cm.

The above-mentioned ink was subjected to the same adhesiveness test as in Example 1 by using stainless steel plates coated with platinum plating. As a result, similar results as in Example 1 were obtained under no voltage application and under voltage application.

When the ink was subjected to a printing operation by means of the printing device used in Example 1, a large number of printed matters having a sharp image quality were obtained.

During the above-mentioned printing operation, neither the production of a gas nor deposition of a substance on the anode of the ink-carrying roller 1 was observed. Further, a sensitivity decrease due to a change in the electric conductivity was not observed.

EXAMPLE 6

An ink according to the present invention was prepared in the same manner as in Example 1 except that 10 g of EF-105 ($RfSO_3Li$ (Rf: perfluoroalkyl group), mfd. by Mitsubishi Kinzoku K.K.) was used instead of 10 g of $LiBF_4$ used in Example 1. The thus prepared ink showed an electric conductivity of 878 ohm.cm.

The above-mentioned ink was subjected to the same adhesiveness test as in Example 1 by using stainless steel plates coated with platinum plating. As a result, similar results as in Example 1 were obtained under no voltage application and under voltage application.

When the ink was subjected to a printing operation by means of the printing device used in Example 1, a large number of printed matters having a sharp image quality were obtained.

During the above-mentioned printing operation, neither the production of a gas nor deposition of a substance on the anode of the ink-carrying roller 1 was observed. Further, a sensitivity decrease due to a change in the electric conductivity was not observed.

COMPARATIVE EXAMPLE 1

An ink was prepared in the same manner as in Example 1 except that 10 g of KCl was used instead of 10 g of $LiBF_4$ used in Example 1. The thus prepared ink was subjected to the same image formation in the same manner as in Example 1. As a result, chlorine gas was detected in the neighborhood of the ink-carrying roller 1.

COMPARATIVE EXAMPLE 2

An ink was prepared in the same manner as in Example 1 except that 10 g of KI was used instead of 10 g of $LiBF_4$ used in Example 1. The thus prepared ink was subjected to the same image formation in the same manner as in Example 1. As a result, coloring was observed in the ink image 8 which might be attributable to the deposition of iodine on the ink-carrying roller 1.

EXAMPLE 7

| <Composition A> | |
|---|---|
| Propylene glycol | 48 wt. parts |
| Water | 12 wt. parts |
| Polyvinyl alcohol | 14 wt. parts |
| (Gohsenol GL-03, mfd. by Nihon Gosei Kagaku K.K.) | |
| Carbon black | 7 wt. parts |
| (Stering SR, mfd. by Cabot Co., U.S.A.) | |
| <Composition B> | |
| Silica | 11 wt. parts |
| (Aerosil 200, mfd. by Nihon Aerosil K.K.) | |
| 20 wt. % Propylene glycol solution of sodium tetraborate | 12 wt. parts |
| Lithium borofluoride | 6 wt. parts |

The above components in Composition A were uniformly mixed under heating at 80–90° C., and to the resultant mixture, the above components in Composition B were added and stirred thereby to prepare a gel ink having a volume resistivity of 950 ohm.cm.

The thus obtained ink was subjected to image formation by using a recording apparatus as shown in FIG. 3. Referring to FIG. 3, an ink-carrying roller 21 of a stainless steel cylinder having an outside diameter of 40 mm was rotated in the arrow F direction, and the ink 22 was carried thereon. The ink 22 was formed into an ink layer having a constant thickness by an ink application means 24 rotating in the direction of arrow G.

In this instance, the peripheral speed of the ink-carrying roller 21 was set to 20 mm/sec, that of the ink coating roller 24 was set to 24 mm/sec, and the gap therebetween was set to 1.0 mm, so that the ink layer formed on the surface of the ink-carrying roller 21 had a thickness of 1.2 mm.

An intermediate transfer roller 26 of a stainless steel cylinder having an outside diameter of 30 mm was disposed above the ink-carrying roller 1 with a gap of about 1.0–1.2 mm from the surface of the ink-carrying roller 21. The intermediate transfer roller 26 was rotatable by a driving means (not shown) in the direction of arrow H while being in contact with the ink layer formed on the ink-carrying roller 1. Further, a platinum electrode was used as a recording electrode 25 and a recording voltage of +30 V was used.

The resultant image density was compared with that obtained by an ink containing an electrolyte which was insoluble in a glycol-type solvent, and the production of halogen gas and coloring on the recording paper due to halogen were also observed, whereby the ink was evaluated. The results are shown in Table 1 appearing hereinafter.

EXAMPLE 8

| <Composition C> | |
|---|---|
| Propylene glycol | 30 wt. parts |
| Polyvinyl alcohol | 6 wt. parts |
| (Gohsenol GL-03, mfd. by Nihon Gosei Kagaku K.K.) | |
| Carbon black | 3.5 wt. parts |
| (Stering SR, mfd. by Cabot Co., U.S.A.) | |
| <Composition D> | |
| Silica | 4 wt. parts |
| (Aerosil 200, mfd. by Nihon Aerosil K.K.) | |
| 20 wt. %-Propylene glycol solution of sodium tetraborate | 4 wt. parts |
| Triethanolamine | 0.5 wt. part |
| Lithium borofluoride | 3 wt. parts |

An ink according to the present invention was prepared in the same manner as in Example 7 by using the above Compositions C and D instead of the Compositions A and B used in Example 7. The thus prepared ink had a volume resistivity of 1100 ohm.cm.

The above ink was evaluated in the same manner as in Example 7. The results are shown in Table 1 appearing hereinafter.

EXAMPLE 9

| <Composition E> | |
|---|---|
| Ethylene glycol | 48 wt. parts |
| Water | 12 wt. parts |
| Polyvinyl alcohol | 14 wt. parts |
| (Gohsenol GL-03, mfd. by Nihon Gosei Kagaku K.K.) | |
| Carbon black | 7 wt. parts |
| (Stering SR, mfd. by Cabot Co., U.S.A.) | |
| <Composition F> | |
| Silica | 11 wt. parts |
| (Aerosil 200, mfd. by Nihon Aerosil K.K.) | |
| 20 wt. %-Propylene glycol solution of sodium tetraborate | 12 wt. parts |
| Lithium borofluoride | 6 wt. parts |

An ink according to the present invention was prepared in the same manner as in Example 7 by using the above Compositions E and F instead of the Compositions A and B used in Example 7. The thus prepared ink had a volume resistivity of 900 ohm.cm.

The above ink was evaluated in the same manner as in Example 7. The results are shown in Table 1 appearing hereinafter.

EXAMPLE 10

| <Composition G> | |
|---|---|
| N-methylacetamide | 17 wt. parts |
| Water | 13 wt. parts |
| Polyvinyl alcohol | 3 wt. parts |
| (Gohsenol GL-03, mfd. by Nihon Gosei Kagaku K.K.) | |
| Dye | 1.2 wt. parts |
| (Kayacion Red P-2B, mfd. by Nihon Kayaku K.K.) | |
| <Composition H> | |
| Silica | 4 wt. parts |
| (Aerosil 200, mfd. by Nihon Aerosil K.K.) | |
| Triethanolamine | 1 wt. part |
| 20 wt. %-Propylene glycol solution of sodium tetraborate | 3 wt. parts |
| Lithium borofluoride | 3 wt. parts |

An ink according to the present invention was prepared in the same manner as in Example 7 by using the above Compositions G and H instead of the Composition A and B used in Example 7.

The above ink was evaluated in the same manner as in Example 7. The results are shown in Table 1 appearing hereinafter.

COMPARATIVE EXAMPLE 3

| <Composition I> | |
|---|---|
| Propylene glycol | 20 wt. parts |
| Water | 6 wt. parts |
| Polyvinyl alcohol | 6 wt. parts |
| (Gohsenol GL-03, mfd. by Nihon Gosei Kagaku K.K.) | |
| Potassium iodide | 3.5 wt. parts |
| Carbon black | 2.5 wt. parts |
| (Stering SR, mfd. by Cabot Co., U.S.A.) | |
| <Composition J> | |
| Silica | 3 wt. parts |
| (Aerosil 200, mfd. by Nihon Aerosil K.K.) | |
| 20 wt. %-Propylene glycol solution of sodium tetraborate | 2.2 wt. parts |
| 1N—NaOH aqueous solution | 0.3 wt. part |

An ink was prepared in the same manner as in Example 7 by using the above Compositions I and J instead of the Compositions A and B used in Example 7. The thus prepared ink had a volume resistivity of 260 ohm.cm.

The above ink was evaluated in the same manner as in Example 7. The results are shown in Table 1 appearing hereinafter.

COMPARATIVE EXAMPLE 4

| <Composition K> | |
|---|---|
| Propylene glycol | 20 wt. parts |
| Water | 6 wt. parts |
| Polyvinyl alcohol | 6 wt. parts |
| (Gohsenol GL-03, mfd. by Nihon Gosei Kagaku K.K.) | |
| Potassium chloride | 1.6 wt. part |
| Carbon black | 2.5 wt. parts |
| (Stering SR, mfd. by Cabot Co., U.S.A.) | |

An ink was prepared in the same manner as in Example 7 by using the above Compositions K and J instead of the Compositions A and B used in Example 7. The thus prepared ink had a volume resistivity of 260 ohm.cm.

The above ink was evaluated in the same manner as in Example 7. The results are shown in Table 1 appearing hereinafter.

TABLE 1

| | Example 7 | Example 8 | Example 9 | Example 10 | Com. Example 3 | Com. Example 4 |
|---|---|---|---|---|---|---|
| Electrolyte | LiBF$_4$ | LiBF$_4$ | LiBF$_4$ | LiBF$_4$ | KI | KCl |
| Liquid dispersion medium | Propylene glycol/ Water | Propylene glycol/ Water | Ethylene glycol/ Water | N-methyl- acetamide/ Water | Propylene glycol/ Water | Propylene glycol/ Water |

TABLE 1-continued

|  | Example 7 | Example 8 | Example 9 | Example 10 | Com. Example 3 | Com. Example 4 |
| --- | --- | --- | --- | --- | --- | --- |
| Image quality |  |  |  |  |  |  |
| Initial | Good | Good | Good | Good | Good | Good |
| After 5 hr.*3 | Good | Good | Good | *1 | *2 | *2 |
| After 10 hr.*3 | Good | Good | Good | *1 | *2 | *2 |
| Coloring of transfer paper*4 | None | None | None | None | Observed | None |
| Generation of halogen gas | None*5 | None*5 | None*5 | None*5 | None | Observed*6 |

*1 The image density was somewhat low but was practically acceptable according to naked eye observation.
*2 The image density was low according to naked eye observation.
*3 The image quality was evaluated after successive image formation was effected for 5 hours (or 10 hours) so that A-4 printed matters (proportion of image area: 7%) were produced at a rate of 4 sheets/min.
*4 The coloring was evaluated according to naked eye observation.
*5 The concentration of HF (hydrogen fluoride) was below 0.25 ppm.
*6 The concentration of Cl 2 gas was above 25 ppm.

As apparent from the above-mentioned results shown in Table 1, the inks of Comparative Examples 3 and 4 could not provide good image after successive image formation of 10 hours. On the other hand, the inks of Example 7 to 10 provided images even after successive image formation of 10 hours. Based on the above-mentioned results, it was confirmed that the ink according to the present invention was excellent in stability even when subjected to successive use. Particularly, the inks containing a suitable amount of a polyhydric alcohol-type solvent obtained in Examples 7 to 9 were excellent in the stability.

As described hereinabove, according to the present invention, there is provided an ink suitably used for a novel image forming method which is capable of effecting a recording by changing an ink adhesiveness under the application of a voltage.

Since the ink according to the present invention contains a specific electrolyte which provides substantially no halogen ion even when subjected to electrolytic dissociation, printed matters having a high image quality may be obtained without production of halogen gas or attachment of colored halogenous deposition to paper.

What is claimed is:

1. A recording material, comprising at least a liquid dispersion medium in an amount of 40-95 wt % of the recording material and an electrolyte contained therein in an amount of 0.05 wt. part to the saturation solubility with respect to 100 wt. parts of the liquid dispersion medium; said electrolyte providing substantially no halogen ion in the liquid dispersion medium under electrolytic dissociation; said recording material being adhesive under no voltage application and losing its adhesiveness on one of a pair of electrodes when imparted with a voltage by means of the pair of electrodes, so that the recording material is selectively attached to the other of said pair of electrodes on voltage application.

2. A recording material according to claim 1, wherein said liquid dispersion medium comprises a polyhydric alcohol-type solvent.

3. A recording material according to claim 2, wherein said polyhydric alcohol-type solvent comprises glycerin.

4. A recording material according to claim 2, wherein said liquid dispersion medium comprises a polyhydric alcohol-type solvent and water.

5. A recording material according to claim 1, wherein said electrolyte comprises one or more species selected from the group consisting of lithium borofluoride ($LiBF_4$), sodium hexafluorophosphate ($NaPF_6$), ammonium hexafluorophosphate ($NH_4PF_6$), and sodium acetate ($CH_3COONa$).

6. A recording material according to claim 1, which contains 0.1 wt. part to the saturation solubility of said electrolyte with respect to 100 wt. part of the liquid dispersion medium.

7. A recording material according to claim 1, which contains 1.0 wt. part to the saturation solubility of said electrolyte with respect to 100 wt. part of the liquid dispersion medium.

8. A recording material according to claim 1, which comprises the liquid dispersion medium, the electrolyte and inorganic or organic fine particles.

9. A recording material according to claim 8, wherein said fine particles comprises swelling fine particles.

10. A recording material according to claim 1, which further comprises a crosslinked substance impregnated with said liquid dispersion medium and electrolyte.

11. An image forming method, comprising:
providing a recording material according to claim 1;
supplying the recording material between a pair of electrodes, at least one of which is a plate comprising an electroconductive portion and an insulating portion; and
applying a voltage between the pair of electrodes so that said plate may be a cathode, thereby to attach the recording material to the insulating portion of the plate.

* * * * *

UNITED STATES PATENT AND TRADEMARK OFFICE
CERTIFICATE OF CORRECTION

PATENT NO. : 5,017,223
DATED : May 21, 1991
INVENTOR(S) : Motokazu Kobayashi et al.

It is certified that error appears in the above-identified patent and that said Letters Patent is hereby corrected as shown below:

COLUMN 1:

Line 11, "printer, wire dot printer" should read --printers, wire dot printers--.

Line 12, "printer." should read --printers.--

COLUMN 4:

Line 50, "be" should be deleted.

COLUMN 5:

Line 19, "(sample" should read --sample--.

Line 41, "boroflorides)" should read --borofluorides)--.

COLUMN 8:

Line 54, "its" should read --a--.

COLUMN 12:

Line 16, "plate" should read --plates--.

Line 58, "broad-sense" should read --broad sense--.

COLUMN 14:

Line 38, "at" should read --of--.

UNITED STATES PATENT AND TRADEMARK OFFICE
CERTIFICATE OF CORRECTION

PATENT NO. : 5,017,223
DATED : May 21, 1991
INVENTOR(S) : Motokazu Kobayashi et al.

It is certified that error appears in the above-identified patent and that said Letters Patent is hereby corrected as shown below:

COLUMN 15:

Line 44, "plate" should read --plates--.

COLUMN 16:

Line 48, "were" should read --was--.

COLUMN 17:

Line 2, "were" should read --was--.

Line 18, "were" should read --was--.

Line 40, "were" should read --was--.

COLUMN 22:

Line 44, "comprises" should read --comprise--.

Signed and Sealed this

Fifteenth Day of December, 1992

Attest:

DOUGLAS B. COMER

*Attesting Officer*     Acting Commissioner of Patents and Trademarks